United States Patent [19]

Cooperman

[11] Patent Number: 4,975,119

[45] Date of Patent: Dec. 4, 1990

[54] LIQUID ANTISETTLING AGENTS FOR ORGANIC COATING COMPOSITIONS

[75] Inventor: Murray C. Cooperman, Woodbridge, N.J.

[73] Assignee: Rheox, Inc., Hightstown, N.J.

[21] Appl. No.: 342,799

[22] Filed: Apr. 25, 1989

[51] Int. Cl.$^5$ ............................................. C09D 7/02
[52] U.S. Cl. .................................. 106/271; 106/224; 106/228
[58] Field of Search .................... 106/224, 271, 228

[56] References Cited

U.S. PATENT DOCUMENTS

| | | | |
|---|---|---|---|
| 3,123,488 | 3/1964 | Lindlaw | 106/271 |
| 3,184,323 | 5/1965 | Lindlaw | 106/272 |
| 3,562,194 | 2/1971 | Offerman et al. | 106/256 |
| 3,937,678 | 2/1976 | Yasuda et al. | 106/271 |
| 3,985,568 | 10/1976 | Swenson et al. | 106/271 |

*Primary Examiner*—Mark L. Bell
*Assistant Examiner*—Deborah Jones
*Attorney, Agent, or Firm*—Burns, Doane, Swecker & Mathis

[57] ABSTRACT

The present invention relates to a liquid antisettling composition comprising at least one emulsifiable polyethylene wax, at least one salt of an alkyl hydrogen sulfate, at least one salt of a reaction product of a polyvalent inorganic acid and a fatty ester compound or a fatty acid derivative, an organic solvent and optionally, water.

10 Claims, No Drawings

LIQUID ANTISETTLING AGENTS FOR ORGANIC COATING COMPOSITIONS

BACKGROUND OF THE INVENTION

The present invention relates to liquid antisettling compositions that provide excellent pigment suspension properties to organic compositions and effective sag control to organic coating compositions.

It is known in the art to add pigment suspension or antisettling agents to organic coating compositions to prevent pigments or other finely divided solid particles from settling during storage. It is also known to add these agents to organic coating compositions as rheology modifiers to prevent sagging when the coating composition is applied to a vertical surface. The art has constantly sought materials that are useful to control the pigment suspension properties of various organic compositions, provide effective sag control and, additionally, are easy to use.

U.S. Pat. No. 3,123,488 discloses a heat-stable composition useful to modify the rheological and suspension properties of non-aqueous fluid systems containing finely divided solid particles. The composition disclosed therein consists of a finely divided polyethylene wax dispersed in an organic liquid vehicle that is compatible with paint. The composition is water free and the organic vehicle is present in an amount of from 40% to 95% by weight based on the weight of the total composition. The emulsifiable polyethylene wax has a melting point between about 208° F. and about 221° F., a penetration hardness between about 1 and about 6, an acid number between about 2 and about 50, and a saponification number between about 9 and about 25.

U.S. Pat. No. 3,184,323 discloses a heat stable composition that is useful to modify rheological and suspension properties of non-aqueous fluid systems containing finely divided solid particles. The composition consists of a finely divided polyethylene wax dispersed in an organic liquid vehicle which is compatible with paint. The composition is described as water free and the organic vehicle is present in an amount of from about 40% to about 95% by weight based on the weight of the total composition. The emulsifiable polyethylene wax has a melting point between about 200° F. and about 230° F., a penetration hardness between about 1 and about 10, an acid number between about 0 and about 5, and a saponification number between about 9 and about 25. The emulsifiable polyethylene waxes differ from those disclosed in U.S. Pat. No. 3,123,488 in that the free acid groups contained in the emulsifiable polyethylene wax are reacted with chemicals such as ethylene diamine, monoethanolamine, toluene diisocyanate, and sodium hydroxide to achieve a lower acid number.

U.S. Pat. No. 3,562,194 discloses an additive for preparing thixotropic oil-based paints. The additive is a salt of a reaction product of a polyvalent inorganic acid such as sulfuric, phosphoric, or boric acid and an ester such as an ester of low epoxide oxygen content of an unsaturated aliphatic carboxylic fatty acid and a saturated alcohol, or an ester of low epoxide content of an unsaturated fatty alcohol and carboxylic acid. This patent describes the use of sulfated/sulfonated castor oil as a rheology modifier and a suspending agent for pigments in oil-based paints.

U.S. Pat. No. 3,937,678 discloses a process for improving the rheological properties and suspension properties of non-aqueous fluid systems containing finely divided solid particles by adding to the non-aqueous fluid system a mixture of an amide wax having a melting point of from about 100° C. to about 160° C. obtained by reacting a hydrogenated castor oil fatty acid or an organic acid mixture containing at least 30 molar percent of hydrogenated castor oil fatty acid with amines, and an emulsifiable polyethylene wax having an acid number of from about 2 to about 50, a softening point of from about 95° C. to about 120° C., a density of from about 0.92 to about 0.98, and a penetration hardness of from about 1 to about 20.

U.S. Pat. No. 3,985,568 discloses a creamy paste comprising finely divided particles of an emulsifiable polyethylene wax suspended in a sulfated/sulfonated castor oil solution. The paste contains from 1 to 6 parts emulsifiable polyethylene wax per part of sulfated/sulfonated castor oil. The composition is useful for modifying the rheological and suspension properties of non-aqueous fluid systems containing finely divided solid particles.

Japan Kokai 76 04 087 discloses the use of emulsifiable polyethylene waxes to stabilize a dispersion of pigments in water thinned coating compositions.

Most antisettling agents and rheology modifiers of the art that are based on emulsifiable polyethylene waxes dispersed in an organic solvent are creamy or hard pastes. These compositions are difficult to handle during the manufacture of paints. To avoid the use of a gel, a paint manufacturer would have to dilute the creamy paste or gel with a solvent to prepare a pourable or pumpable fluid product. However, this procedure is undesirable due to the necessity of high shear mixing equipment to achieve homogenous dilutions. Further, a separate mixing tank is also required.

Despite the numerous types of pigment suspending agents known in the art, new additives for modifying the rheological and suspension properties of non-aqueous fluid systems containing finely divided solid particles are desired that are efficient and can be easily handled.

SUMMARY OF THE INVENTION

The present invention overcomes the problems and disadvantages of the prior art by providing a homogeneous, pourable, liquid additive which provides excellent pigment suspension properties to organic compositions and provides effective sag control to organic coating compositions.

It is an object of the invention to provide a liquid, pourable composition that provides suspension properties to organic compositions containing finely divided solid particles, that is easy to handle and is readily incorporated into organic compositions.

An additional object of the invention is to provide a process for improving the rheological and suspension properties of organic compositions containing finely divided solid particles.

It is yet another object of the invention to provide stable suspensions of finely divided solid particles in organic compositions that do not exhibit excessive syneresis or hard settling during prolonged storage periods.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a liquid antisettling composition comprising (a) at least one emulsifiable polyethylene wax; (b) at least one salt of an alkyl hydrogen sulfate; (c) at least one salt of a reaction product of a polyvalent inorganic acid and a fatty ester compound or fatty acid derivative; (d) an organic solvent; and optionally (e) water.

The liquid antisettling composition of the invention imparts suspension properties to organic compositions and provides effective sag control to organic coating compositions. The liquid antisettling composition of the invention is highly efficient in sag control and suspension properties and can be used at lower loadings than commercially available products. The composition provides easier dispersion in paint systems than prior art pigment suspension or antisettling agents. Further, the composition of the invention has a lower activation temperature than commercially available products which results in a shorter processing time. Since the composition is in a liquid form that is pourable and pumpable, it can be easily handled in a manufacturing plant and thus reduces handling time and handling losses. Further, the antisettling composition is heat stable and freeze-thaw stable. Moreover, the process for preparing the liquid antisettling composition does not require quick chill, high shear techniques and thus can be easily conducted.

The invention also provides a process for improving the rheological and suspension properties of organic compositions containing finely divided solid particles comprising adding the liquid antisettling composition of the invention to an organic composition.

Reference will now be made in detail to the present preferred embodiments of the invention.

DESCRIPTION OF THE PREFERRED EMBODIMENTS

The antisettling composition of the invention is useful in organic compositions, particularly organic coating compositions such as solvent-based paints.

Preferably, at least one emulsifiable polyethylene wax is present in the antisettling composition of the invention in an amount of from about 3 to about 28 weight percent, more preferably in an amount of from about 12 to about 25 weight percent, most preferably in an amount of from about 15 to about 19 weight percent. Exemplary suitable polyethylene waxes are set forth in U.S. Pat. Nos. 3,123,488 and 3,184,323.

Preferably, emulsifiable polyethylene waxes employed in the invention have an acid number of from about 0 to about 50, more preferably from about 7 to about 30, most preferably from about 13 to about 17. The emulsifiable polyethylene waxes can be prepared by neutralizing the free carboxylic acid group with a group 1-A metal compound such as lithium, sodium, potassium, cesium and the like, or by reacting the free carboxylic acid with ammonia and amines such as mono, di, and triethanolamine, monopropanolamine, and ethylene diamine. Additionally, the carboxyl constituent of the emulsifiable polyethylene can be chemically modified to reduce the acid value by reacting the free carboxylic acid group with a monoisocyanate such as phenyl isocyanate. The reaction of the above described materials with the free acid groups in the emulsifiable polyethylene polymer results in from about 5 to about 100% neutralization, with almost complete neutralization of the acid number giving values between 0 and about 5.

Preferably, the emulsifiable polyethylene wax has a softening point between about 90° C. and about 120° C., a density of from about 0.92 to about 0.98 g/cc, and a penetration hardness of from about 1 to about 20 dmm (ASTM D-5).

Exemplary suitable emulsifiable polyethylene waxes for use in the invention include carboxyl-containing ethylene polymers and copolymers such as oxidized polyethylene homopolymers, ethylene-acrylic acid copolymers, and ethylene-vinyl acetate copolymers. Suitable emulsifiable polyethylene waxes are commercially available under the tradename A-C polyethylenes from Allied-Signal, Inc. and Epolene waxes available from Eastman Kodak Company.

Preferably, low density oxidized polyethylene homopolymers having a density of from about 0.92 g/cc to about 0.94 g/cc and an acid number of from about 10 to about 20 are employed.

Preferably, the salt of an alkyl hydrogen sulfate employed in the composition of the invention has the general formula $RSO_4^+X^-$ wherein R represents a group containing from about 8 to about 22 carbon atoms. Some salts contain non-reactive groups such as ether, alkoxy, or halogen groups. Preferably, R represents a group containing from about 10 to about 18 carbon atoms, most preferably R represents 12 carbon atoms. The salt is preferably present in the antisettling composition of the invention in an amount of from about 0.3 to about 10 weight percent, more preferably in an amount of from about 0.5 to about 5 weight percent, most preferably in an amount of from about 1.0 to about 4 weight percent.

Exemplary suitable salts include salts derived from long chain fatty alcohols that have been sulfated by reaction with sulfuric acid followed by neutralization with an inorganic or organic base; salts of an ethoxylated alkyl hydrogen sulfate that have been prepared by the neutralization of ethoxylated long chain fatty alcohols that have been sulfated by reaction of the alcohol group with sulfuric acid, followed by neutralization with an inorganic or organic base. Neutralization can be achieved with a group 1-A metal compound as the hydroxide, oxide, or carbonate and the like, as well as reaction with ammonia and certain amines including mono-, di, and triethanolamine, monopropylamine and other amines. Exemplary suitable neutralized salts of a long chain organic hydrogen sulfate or hydrogen sulfonate include sodium lauryl sulfate, sodium decyl sulfate, a sodium salt of 1-hexadecylsulfonic acid, a disodium salt of 2,6-naphthalenedisulfuric acid, a sodium salt of p-phenol sulfonic acid, potassium salt of hydroquinone sulfonic acid, and triethanolamine lauryl sulfate.

Preferably, salts selected from the group consisting of sodium decyl sulfate, sodium lauryl sulfate, sodium salt of 1-hexadecylsulfonic acid, and triethanolamine lauryl sulfate are employed. More preferably, sodium lauryl sulfate is employed.

The salt component is a reaction product of a polyvalent inorganic acid and a fatty ester compound or its acid derivative. Exemplary suitable ester compounds or its acid derivative include an ester of low epoxide oxygen content of an unsaturated aliphatic carboxylic fatty acid and a saturated alcohol, or an ester of low epoxide content of an unsaturated fatty alcohol and a carboxylic acid. Exemplary suitable salts of a reaction product of a polyvalent inorganic acid and a fatty ester compound include sulfated/sulfonated fatty ester compounds or their acid derivatives and fatty oils including triglycerides and long chain fatty monoesters such as stearyl oleate that contain neutralized sulfate esters or sulfonate groups, and their fatty acid derivatives wherein the hydrogen sulfate group or hydrogen sulfonate group is at least partially or wholly neutralized. The sulfate esters or sulfonate groups can be obtained by the reaction of unsaturated double bonds, hydroxyl groups, or epoxide groups with sulfuric acid. In the case where an epoxide group is reacted with sulfuric acid, the resulting product contains a hydroxyl group and a hydrogen sulfate group which is further neutralized by a base. By definition, sulfated fatty ester compounds (oils) are neutralized salts wherein the $OSO_3H$ group is neutralized, most preferably with sodium hydroxide. Sulfonated fatty ester compounds are neutralized salts wherein the $SO_3H$ group is neutralized. Neutralization can be achieved with a group 1-A metal compound as the hydroxide, oxide, or carbonate, and the like such as lithium, sodium, potassium, cesium and the like, as well as reaction with ammonia and certain amines including mono-, di, and triethanolamine, monopropylamine, and other amines.

Exemplary suitable compounds in which hydrogen sulfate or hydrogen sulfonate group has been partially or wholly neutralized include sulfated/sulfonated castor oil, sulfated/sulfonated ricinoleic acid, sulfonated sperm oil, sulfonated olive oil, sulfonated oleic acid, sulfated epoxidized soybean oil, sulfated epoxidized sperm oil, sulfated epoxidized castor oil, and sulfated epoxidized glycerol trioleate. Preferred sulfated/sulfonated fatty esters or their acid derivatives include sulfated castor oil, sulfated epoxidized soybean oil, sulfated epoxidized castor oil, and sulfated epoxidized glycerol trioleate. The most preferred composition is sulfated castor oil. A representative process for preparing sulfated castor oil is disclosed in U.S. Pat. No. 2,266,843. Sulfated castor oil, also known as turkey red oil, is commercially available under the tradename Eureka 102 from Atlas Refinery, Inc.

Preferably, at least one of the salts of a reaction product of a polyvalent inorganic acid and a fatty ester compound or its acid derivative is present in the liquid antisettling composition of the invention in an amount of from about 0.3 wt.% about 10.0 wt.% more preferably from about 0.5% to about 5.0 wt.%, most preferably from about 1.0 wt.% to about 4.0 wt.%.

Water is generally included in the antisettling composition of the invention, preferably in an amount of from about 0.1 wt.% to about 5 wt.%, more preferably from about 0.1 wt.% to about 1.5 wt.%, most preferably from about 0.2 wt.% to about 1.0%. It has been found that the addition of an extra amount of water enhances long-term product stability and prevents syneresis in the pigment suspension additive. The presence of water is believed to enhance the emulsifying properties in an organic solvent of the salt of the alkyl hydrogen sulfate by increasing its solubility in the mixture.

The mixture of components (a), (b), (c), and (e) is diluted with an appropriate organic solvent. Any well-known aromatic or aliphatic mixtures of organic solvent may be used, most preferably those which are economical and widely used in the coatings industry such as mineral spirits, xylene, toluene and the like. The solvent is preferably present in an amount of from about 70 wt.% to about 95 wt.%, more preferably from about 75 wt.% to about 85 wt.%, most preferably from about 77 wt.% to about 81 wt.%. Organic solvents useful for the production of pourable dispersions of emulsifiable polyethylene waxes include hydrocarbons, halogenated hydrocarbons, ketones, ethers and polyethers, esters, ether-alcohols, alcohols, polyols, and aliphatic, cycloaliphatic, aromatic hydrocarbons, such as benzene, toluene, xylene, turpentine, dipentene, naphtha solvent, styrene, mineral spirits, mineral oils, hexane, heptane, odorless white spirits, methanol, ethanol, propanol, butanol, carbitol, glycerol, ethylene glycol, acetone, methyl ethyl ketone, methyl isobutyl ketone, ethyl acetate, butyl acetate, ethylene glycol ethers, propylene carbonate and ethylene glycol ethyl ether.

The finely divided solid particles to be suspended by the compositions of this invention should be of a colloidal nature or a size that can be dispersed in the organic medium. The particles should be substantially insoluble in the medium in which they are suspended. There is no particular upper limit on particle size, but the size should be such that the particles are capable of being initially suspended in the selected medium. The solid particles may be pigments, inert fillers, fillers, reflecting agents, and the like.

The emulsifiable polyethylene waxes are most effective when present in the liquid organic base vehicle in a finely divided, suspended form. That is, the liquid suspension composition should be a homogeneous fluid emulsion. The most effective method for getting the emulsifiable polyethylene wax into a finely divided form involves melting or dissolving the wax in the organic base vehicle in the presence of the other components by heating at a temperature range which is somewhat limited by the type of organic solvent. As the reaction mixture cools, the polyethylene wax comes out of solution in a finely divided, suspended form.

The antisettling compositions of the present invention can be prepared by any known techniques which will melt or disperse the polyethylene wax in an organic base vehicle containing an organic solvent, a salt of a reaction product of a polyvalent inorganic acid and a fatty ester compound or a fatty acid derivative, a salt of an alkyl hydrogen sulfate, and optionally, water. For example, the ingredients (an emulsifiable polyethylene wax, salt of an alkyl hydrogen sulfate, salt of a reaction product of a polyvalent inorganic acid and a fatty ester compound or a fatty acid derivative, solvent and water, if present) may be charged to a suitable reaction vessel equipped with a mechanical stirrer, a thermometer, and a nitrogen inlet. The vessel can be heated with stirring under a nitrogen blanket. (The use of a nitrogen blanket is optional in that the presence of $N_2$ inhibits a dark coloring of the product but in no way affects product performance). The materials can be added at any time and at any temperature during the heating with the requirement that the emulsifiable polyethylene wax is melted or finely dispersed and a uniform liquid mass is obtained. This usually requires a temperature of 85°-120° C., preferably 105°-120° C. or any other temperature at which the emulsifiable polyethylene wax melts or dissolves. The resulting liquid product can be cooled with or without agitation, but slow agitation is preferred. In either case, a homogenous fluid product is obtained. In contrast to previous polyethylene wax based pigment suspension agents provided by the prior art which require rapid cooling with the application of high shear, superior products are obtained when the cooling rate is slow. On the other hand, if the cooling rate is rapid, with or without high shear, an acceptable product is also formed.

The homogeneous liquid antisettling compositions of the invention can be employed in various organic compositions to prevent settling of finely divided solid particles.

The liquid antisettling compositions of the present invention may be used as a rheology modifier and suspension agent of finely divided solid particles in a variety of organic solvent-based compositions. The compositions of the invention are useful, for example, in imparting antisettling properties to aliphatic and aromatic-solvent based compositions and mixed aromatic/aliphatic based compositions and may also be used in moderately and highly polar or oxygenated solvent based compositions (e.g., ketones and alcohols). Illustrative organic solvent-based compositions include: (a) aliphatic alkyd paints such as trade sales solvent-based paints, (b) aromatic solvent-based paints based on acrylic, alkyd, polyurethane, polyamide and polyester binders such as standard quality industrial paints which include appliance enamels, equipment enamels, and automotive refinish enamels, (c) industrial finishes such as phenoxy zinc rich primers and epoxy metal primers and (d) certain sealants. Of course, suspension agents based on different organic solvents will be more appropriate to specific coating systems in which the solvents are more compatible.

The amount of antisettling composition used in a specific application is determined by numerous factors including the type of emulsifiable polyethylene wax, the type of organic solvent-based compositions that require an antisettling additive, and the level of performance (pigment suspension control and sag control) desired. However, a general range is from about 1.0 to about 30 pounds per hundred gallons (phg) of organic composition.

The effectiveness of the antisettling compositions of this invention was determined by use in various organic coating compositions and other formulations.

The invention will be further clarified by the following examples, which are intended to be purely exemplary of the invention.

EXAMPLE 1

Preparation of Antisettling Composition in Mineral Spirits

To a resin flask having a 5 L capacity equipped with a water condenser, thermometer, nitrogen gas inlet tube, high speed agitator, and a heating mantle with an automatic temperature control, 221.2 g of oxidized polyethylene wax (AC 629, available from Allied-Signal, Inc.), 221.2 g of oxidized polyethylene wax (Epolene E-14, available from Eastman-Kodak), 58.8 g of sulfated castor oil, (Eureka 102 available from Atlas Refinery, Inc. containing 70% sulfated castor oil and 30% water), 58.8 g of sodium lauryl sulfate, and 2240 g of mineral spirits 66 were added. The reaction flask was blanketed with a nitrogen gas atmosphere with a slow nitrogen flow during the reaction. With slow agitation, the mixture was heated to 97° C. until a slightly hazy liquid was obtained.

As soon as the hazy liquid was obtained, the material was cooled slowly over 4 hours to room temperature. The material, after cooling, was a white opaque, homogeneous liquid product.

1.0 to 2.0 g of the sample were taken and dried in a forced air oven for 16 hours at 105° C. The percent solids of the liquid product was determined to be 19.33%.

EXAMPLE 2

Preparation of Antisettling Composition in Mineral Spirits

To a resin flask having a 3 L capacity equipped with a water condenser, thermometer, nitrogen gas inlet tube, high speed agitator, and a heating mantle with an automatic temperature control, 31.74 g of sulfated castor oil (Eureka 102 available from Atlas Refinery, Inc.), 5.29 g of water, 120.0 g of oxidized polyethylene wax (AC-629, available from Allied-Signal, Inc.), 120.0 g of oxidized polyethylene wax (Epolene E-14 available from Eastman-Kodak Co.), 31.74 g of sodium lauryl sulfate, and 1,102.91 g of mineral spirits 66 were added. The reaction flask was blanketed with a nitrogen gas atmosphere with a slow nitrogen flow during the reaction. The mixture was heated to 111° C. with slow agitation until a slightly hazy liquid was obtained.

As soon as the hazy liquid was obtained, the material was cooled slowly over 4 hours to room temperature. The material, after cooling, was a white opaque, homogeneous liquid product.

1.0 to 2.0 g of the sample were taken and dried in a forced air oven for 16 hours at 105° C. The percent solids of the liquid product was determined to be 20.6%.

EXAMPLE 3

Preparation of Antisettling Composition in Xylene

To a 100 gallon size reactor equipped with a water condenser, thermometer, nitrogen gas inlet tube and high speed agitator, 44.09 lbs. of oxidized polyethylene wax (AC-629 available from Allied-Signal, Inc.), 44.09 lbs. of oxidized polyethylene wax (Epolene E-14 available from Eastman-Kodak Co.), 11.68 lbs. of sulfated castor oil (Eureka 102 available from Atlas Refinery, Inc.), 11.68 lbs. of sodium lauryl sulfate, and 406.97 lbs. of xylene were added. The reaction flask was blanketed with a nitrogen gas atmosphere with a slow nitrogen flow during the reaction. The mixture was heated to 95° C. with slow agitation until a clear liquid was obtained.

As soon as the clear liquid was obtained, the material was cooled slowly over 4 hours to room temperature. After cooling, the material was a white opaque, homogeneous liquid product.

1.0 to 2.0 g of the sample were taken and dried in a forced air oven for 16 hours at 105° C. The percent solids of the liquid product was determined to be 20.32%.

EXAMPLE 4

Preparation of Antisettling Composition in Toluene

To a 100 gallon size reactor equipped with a water condenser, thermometer, nitrogen gas inlet tube and a high speed agitator, 44.09 lbs. of oxidized polyethylene wax (AC-629 available from Allied-Signal, Inc.), 44.09 lbs. of oxidized polyethylene wax (Epolene E-14 available from Eastman-Kodak Co.), 11.68 lbs. sulfated castor oil (Eureka 102 available from Atlas Refinery, Inc.), 11.68 lbs. of sodium lauryl sulfate, and 406.97 lbs. of toluene were added. The reaction flask was blanketed with a nitrogen gas atmosphere with a slow nitrogen flow during the preparation. The mixture was heated to 95° C. with slow agitation until an amber, clear liquid was obtained.

As soon as the amber clear liquid was obtained, the material was cooled slowly over 4 hours to room temperature. After cooling, the material was a white opaque, homogeneous liquid product.

1.0 to 2.0 g of the sample were taken and dried in a forced air oven for 16 hours at 105° C. The percent solids of the liquid product was determined to be 20.4%

Evaluation of the Antisettling Compositions of Examples 1-4

The effectiveness of the antisettling compositions of Examples 1-4 was determined in various paint and other formulations. The data set forth below demonstrate the suitability of the antisettling compositions for use in organic coating compositions.

A high gloss long oil alkyd enamel paint was prepared by mixing the ingredients set forth in Formulation A in the order listed. The ingredients were mixed using a one horsepower high speed disperser equipped with a 2 ¼" diameter disperser blade.

Sag resistance was measured in mils using a Leneta sag multinotch applicator at room temperature in accordance with ASTM D4400-84.

The degree of pigment settling of a paint was evaluated in accordance with ASTM D869-78. On a scale of 0-10, a rating of 0 indicates the presence of a very firm cake that cannot be reincorporated with the liquid to form a smooth paint by stirring manually, and a rating of 10 represents a perfect suspension with no change from the original condition of the paint.

Gloss measurements were measured at 60° in accordance with ASTM D523-80. Drawdowns were prepared of paints prepared according to formulation A, and the 60° gloss determined after curing the films for 24 hours at room temperature.

Stability of the paint was tested by storing each sample of paint for a period of one month, three months, and one year at room temperature (e.g., 70° F.) and one month at 140° F. At the end of the aging period, each sample was examined for appearance, fineness of grind, viscosity, Brookfield viscosity, Stormer viscosity, sag resistance, pigment settling and other properties, if desired.

| Formulation A: High Gloss Long Oil Alkyd Enamel | | | |
|---|---|---|---|
| Ingredient | Generic Name | Manufacturer | Pounds* |
| AROPLAZ 1266M70 | Long Oil Soya Alkyd, 70% N.V. | NL Chemicals | 158.8 |
| Mineral Spirits 66 | Solvent | Ashland Chem. | 30.0 |
| Antisettling Composition | | | (see examples) |
| Mix 5 minutes at 140° F. | | | |
| Titanox 2101 | Titanium Dioxide | NL Chemicals | 240.4 |
| Sparmite | Barium Sulfate | LCI, Inc. | 300.0 |
| Grind 15 minutes at 140° F. | | | |
| Letdown | | | |
| AROPLAZ 1266M70 | Long Oil Soya Alkyd, 70% N.V. | NL Chemicals | 315.3 |
| Mineral Spirits 66 | Solvent | Ashland Chem. | 111.4 |
| 6% Cobalt Nuxtra | Drier | Huls | 2.3 |
| 6% Zirconium Nuxtra | Drier | Huls | 6.1 |
| Exkin #2 | Anti-skinning Agent | Huls | 1.5 |
| Total (without antisettling composition) | | | 1165.8 |

*Basic Formulation; test composition may be prepared with different amounts, but proportional to those set forth.

The liquid antisettling compositions of the invention may be added to the millbase of a trade sales enamel paint prior to the grinding stage wherein pigments such as TiO₂ pigment are added.

After aging the paint on the shelf, the paint properties such as fineness of grind, Brookfield viscosity, Stormer viscosity, and sag resistance at room temperature were measured.

The fineness of grind was measured in Hegman units using a Hegman gauge in accordance with ASTM D1210-79.

Brookfield viscosities at 10 and 100 rpm were measured with a Brookfield viscometer Model RVT in accordance with ASTM D 2196-81. From viscosity data, a Thixotropic Index (TI) was obtained as follows:

$$\text{Thixotropic Index } (TI) = \frac{\text{Viscosity at 10 rpm}}{\text{Viscosity at 100 rpm}}$$

Stormer viscosities were measured in Krebs Units (KU) with a Thomas Stormer Instrument, Model #09730-G15, in accordance with ASTM D562-81.

EXAMPLE 5

The material prepared according to Example 1 was incorporated into a high gloss long oil alkyd enamel described in Formulation A. The antisettling composition of Example 1 was added to the millbase at a 1.8 pounds per hundred gallons loading on a solids basis. The paint properties were evaluated and are set forth in Table 1.

COMPARATIVE EXAMPLE A

A high gloss long oil alkyd enamel paint was prepared according to the procedures described in Formulation A without the addition of an antisettling composition. The paint properties were evaluated and are set forth in Table 1.

COMPARATIVE EXAMPLE B

A high gloss long oil alkyd enamel paint was prepared according to the procedures described in Formulation A, and M-P-A 60MS (available from NL Chemicals, Inc.) was added to the millbase. M-P-A 60MS is a tradename representing an emulsifiable polyethylene wax antisettling composition dispersed in mineral spirits in gel form. The antisettling composition loading was equivalent to 3.6 pounds per hundred gallons on a solids basis. The paint properties were evaluated and are set forth in Table 1.

COMPARATIVE EXAMPLE C

A high gloss long oil alkyd enamel paint was prepared according to the procedures described in Formulation A, and EGO 6 (available from United Catalysts, Inc.) was added to the millbase. EGO 6 is a tradename representing an emulsifiable polyethylene wax antisettling composition dispersed in mineral spirits in gel form. The antisettling composition loading was equivalent to 1.8 pounds per hundred gallons on a solids basis. The paint properties were evaluated and are set forth in Table 1.

EXAMPLE 6

The TT-P-615D Type III primer paint described in Formulation B was used to test the antisettling properties of the composition prepared in accordance with Example 1. The antisettling composition was added to the mill base of a TT-P-615D Type III primer paint according to the procedures described in Formulation B at a loading of 3.6 pounds per hundred gallons on a solids basis. The paint properties were evaluated and are set forth in Table 2.

COMPARATIVE EXAMPLE D

The TT-P-615D type III primer paint was prepared according to the procedures described in Formulation B, and M-P-A 60MS was added to the millbase. The antisettling composition loading was equivalent to 3.6 pounds per hundred gallons on a solids basis. The paint properties were evaluated and are set forth in Table 2.

| Formulation B: Anti-Corrosive Primer | | | |
|---|---|---|---|
| Ingredient | Generic Name | Manufacturer | Pounds* |
| AROPLAZ 1445M50 | Long Oil Soya/Linseed Alkyd, 50% N.V. | NL Chemicals | 192.0 |
| Mineral Spirits 66 | Solvent | Ashland Chem. | 48.9 |
| Antisettling Composition | | | (see examples) |
| Mix 5 minutes at 3,000 rpm | | | |
| XX601 | Zinc Oxide, 0.14µ | NJ Zinc Co. | 42.6 |
| ONCOR M50 | Basic Lead Silicochromate | NL Chemicals | 517.8 |
| B2093F | Brown Iron Oxide | Pfizer Corp. | 42.6 |
| Letdown | | | |
| AROPLAZ 1445M50 | Long Oil/Linseed Alkyd 50% N.V. | NL Chemicals | 303.2 |
| Xylene | Solvent | Ashland Chem. | 30.9 |
| Cellosolve Solvent | Oxygenated solvent | Ashland Chem. | 23.0 |
| 6% Zirconium Nuxtra | Drier | Huls | 6.3 |
| 6% Cobalt Nuxtra | Drier | Huls | 2.5 |
| 6% Calcium Nuxtra | Drier | Huls | 1.3 |
| Exkin #2 | Anti-Skinning Agent | Huls | 1.3 |
| Total (without antisettling composition) | | | 1212.4 |

*Basic Formulation; test composition may be prepared with different amounts, but proportional to those set forth.

EXAMPLE 7

The exterior tint base enamel paint described in Formulation C was used to test the antisettling properties of the composition prepared in accordance with Example 1. The antisettling composition was added to the millbase of an exterior tint base enamel paint according to the procedures described in Formulation C at a loading of 1.44 pounds per hundred gallons on a solids basis. The paint properties were evaluated and are set forth in Table 3.

COMPARATIVE EXAMPLE E

An exterior tint base enamel paint was prepared according to the procedures described in Formulation C without the addition of an antisettling composition. The paint properties were evaluated and are set forth in Table 3.

COMPARATIVE EXAMPLE F

An exterior tint base enamel paint was prepared according to the procedures described in Formulation C, and M-P-A 60MS was added to the millbase. The antisettling composition loading was equivalent to 1.92 pounds per hundred gallons on a solids basis. The paint properties were evaluated and are set forth in Table 3.

COMPARATIVE EXAMPLE G

An exterior tint base enamel was prepared according to the procedures described in Formulation C, and EGO 6 was added to the millbase. The antisettling composition loading was equivalent to 1.44 pounds per hundred gallons on a solids basis. The paint properties were evaluated and are set forth in Table 3.

| Formulation C: Exterior Tint Base Enamel | | | |
|---|---|---|---|
| Ingredient | Generic Name | Manufacturer | Pounds* |
| AROPLAZ 1266M60 | Alkyd Resin | NL Chemicals | 141.0 |
| 6% Zirconium Nuxtra | Drier | Huls | 3.8 |
| Antisettling Composition | | | (see examples) |
| Mix 5 minutes at 3,000 rpm | | | |

-continued

| Formulation C: Exterior Tint Base Enamel | | | |
|---|---|---|---|
| Ingredient | Generic Name | Manufacturer | Pounds* |
| Titanox 2160 | Titanium Dioxide | NL Chemicals | 250.0 |
| GAMA-SPERSE 80 | Calcium Carbonate | Georgia Kaolin | 110.0 |
| Grind 15 minutes at 5,400 rpm at 140° F. | | | |
| Letdown | | | |
| AROPLAZ 1266M60 | Alkyd Resin | NL Chemicals | 441.0 |
| Shell Sol 140 Solvent | Aliphatic Hydrocarbon solvent | Shell Chem. | 55.3 |
| Pine Oil | Bactericide | Arizona Chem. | 13.0 |
| 6% Cobalt Nuxtra | Drier | Huls | 3.2 |
| 4% Calcium Nuxtra | Drier | Huls | 3.2 |
| Exkin #2 | Anti-skinning Agent | Huls | 1.0 |
| Total (without antisettling composition) | | | 1021.5 |

*Basic Formulation; test composition may be prepared with different amounts, but proportional to those set forth.

EXAMPLE 8

The yellow highway marking paint described in Formulation D was used to test the antisettling properties of the composition prepared in accordance with Example 1. The antisettling composition was added to the millbase of a yellow highway marking paint according to the procedures described n Formulation D at a loading of 3.6 pounds per hundred gallons on a solids basis. The paint properties which were obtained are set forth in Table 4.

COMPARATIVE EXAMPLE H

A yellow highway marking paint was prepared according to the procedures described in Formulation D, without the addition of an antisettling composition. The paint properties were evaluated and are set forth in Table 4.

COMPARATIVE EXAMPLE I

A yellow highway marking paint was prepared according to the procedures described in Formulation D, and M-P-A 60MS was added to the millbase. The antisettling composition loading was equivalent to 3.6 pounds per hundred gallons on a solids basis. The paint properties were evaluated and are set forth in Table 4.

COMPARATIVE EXAMPLE J

A yellow highway marking paint was prepared according to the procedures described in Formulation D and EGO 6 was added to the millbase. The antisettling composition loading was equivalent to 3.6 pounds per hundred gallons on a solids basis. The paint properties were evaluated and are set forth in Table 4.

| Formulation D: Yellow Highway Marking Paint | | | |
|---|---|---|---|
| Ingredient | Generic Name | Manufacturer | Pounds* |
| AROPLAZ 1082-V-60 | Medium Oil Soya Alkyd | NL Chemicals | 135.2 |
| Lactol Spirits | Aliphatic Hydrocarbon Solvent | Union Oil Co. | 112.1 |
| Antisettling Composition | | | (see examples) |
| Mix 5 minutes at 3,000 rpm | | | |
| Kelecin F | Soya Lecithin | NL Chemicals | 8.0 |
| ONCOR Y47A | Basic Lead Silico Chromate | NL Chemicals | 147.3 |
| NYTAL 300 | Magnesium Silicate, 5.5μ | R. T. Vanderbilt | 280.4 |
| Snow Flake | Calcium Carbonate 5.5μ | ECC America | 260.4 |
| Grind 15 minutes at 140° F. | | | |
| Letdown | | | |
| CERECLOR 42 | Chlorinated Paraffin | ICI Americas | 55.1 |
| Alloprene X20 Solution** | Chlorinated Rubber Solution | ICI Americas | 235.3 |
| 24% Lead Nuxtra | Drier | Huls | 1.5 |
| 6% Colbalt Nuxtra | Drier | Huls | 0.6 |
| Exkin #2 | Anti-skinning Agent | Huls | 1.0 |
| Propylene Oxide | HCl Scavenger | Aldrich Chem. | 2.0 |
| Lactol Spirits | Aliphatic hydrocarbon solvents | Union Oil | 13.1 |
| Total (without antisettling composition) | | | 1252.0 |

*Basic formulation; test composition may be prepared with different amounts, but proportional to those set forth.
**Where Alloprene X20 solution consists of Alloprene X-20 (80.1 lbs), methyl ethyl ketone (140.2 lbs), and toluene (15.0 lbs).

EXAMPLE 9

The epoxy metal primer paint described in Formulation E was used to test the antisettling properties of the composition prepared in accordance with Example 3. The antisettling composition was added to the millbase of an epoxy metal primer according to the procedures described in Formulation E at a loading of 5.0 pounds per hundred gallons on a solids basis. The paint properties were evaluated and are set forth in Table 5.

EXAMPLE 10

The epoxy metal primer paint described in Formulation E was used to test the antisettling properties of the composition prepared in accordance with Example 3. The antisettling composition was added to the millbase of an epoxy metal primer according to the procedures described in Formulation E at a loading of 3.6 pounds per hundred gallons on a solids basis. The paint properties were evaluated and are set forth in Table 5.

COMPARATIVE EXAMPLE K

An epoxy metal primer paint was prepared according to the procedures described in Formulation E without the addition of an antisettling composition. The paint properties were evaluated and are set forth in Table 5.

COMPARATIVE EXAMPLE L

An epoxy metal primer paint was prepared according to the procedures described in Formulation E, and M-P-A 2000X (available from NL Chemicals, Inc.) was added to the millbase. M-P-A 2000X is a tradename representing an emulsifiable polyethylene wax antisettling composition dispersed in xylene solvent. The antisettling composition loading was equivalent to 5.0 pounds per hundred gallons on a solids basis. The paint properties were evaluated and are set forth in Table 5.

COMPARATIVE EXAMPLE M

An epoxy metal primer paint was prepared according to the procedures described in Formulation E, and M-P-A 2000X was added to the millbase. The antisettling composition loading was 3.6 pounds per hundred gallons on a solids basis. The paint properties were evaluated and are set forth in Table 5.

EXAMPLE 11

An epoxy metal primer paint described in Formulation E was used to test the antisettling properties of the composition prepared in accordance with Example 4. The antisettling composition was added to the millbase of an epoxy metal primer according to the procedures described in Formulation E at a loading of 3.8 pounds per hundred on a solids basis. The paint properties were evaluated and are set forth in Table 6.

COMPARATIVE EXAMPLE N

An epoxy metal primer paint was prepared according to the procedures described in Formulation E without the addition of an antisettling composition. The paint properties were evaluated and are set forth in Table 6.

COMPARATIVE EXAMPLE O

An epoxy metal primer paint was prepared according to the procedures described in Formulation E, and M-P-A 2000T (available from NL Chemicals, Inc.) was added to the millbase. M-P-A 2000T is a tradename representing an emulsifiable polyethylene wax oil antisettling composition dispersed in toluene solvent. The antisettling composition loading was 3.8 pounds per hundred gallons on a solids basis. The paint properties were evaluated and are set forth in Table 6.

| Formulation E: Epoxy Metal Primer | | | |
|---|---|---|---|
| Ingredient | Generic Name | Manufacturer | Pounds* |
| EPOTUF 38-403 | Epoxy Resin | Reichhold Chem. | 77.1 |
| Xylene | Solvent | Ashland Chem. | 36.5 |
| Special Naphtholite 663 | Aliphatic Hydrocarbon | Union Chemicals | 43.6 |
| Antisettling Composition | | | (see examples) |
| Disperse at 3000 rpm for 5 minutes | | | |
| Titanox 2020 | Titanium Dioxide | NL Chemicals | 25.4 |
| B2093F | Brown Iron Oxide | Pfizer Corp. | 40.6 |
| Barytes #1 | Barium Sulfate, 2.5μ | Pfizer Corp. | 309.5 |
| Disperse at 5,400 rpm for 15 minutes at 130–135° F. | | | |
| Letdown | | | |
| EPOTUF 38-403 | Epoxy Resin | Reichhold Chem. | 235.4 |
| BECKAMINE 21-510 | Urea-Formaldehyde Resin | Reichhold Chem. | 18.3 |
| CYCLO-SOL 53 | Aromatic Hydrocarbon | Shell Chemical | 22.3 |
| Xylene | Solvent | Ashland Chem. | 26.4 |
| Special Naphtholite 663 | Aliphatic Hydrocarbon | Union Chemicals | 185.7 |
| 4% Calcium Nuxtra | Drier | Huls | 4.1 |
| 6% Cobalt Nuxtra | Drier | Huls | 0.25 |
| 24% Lead Nuxtra | Drier | Huls | 0.20 |
| Exkin #2 | Anti-Skinning Agent | Huls | 0.25 |
| Total (without antisettling composition) | | | 1025.6 |

*Basic Formulation; test composition may be prepared with different amounts, but proportional to those set forth.

EXAMPLE 12

The epoxy part of an epoxy polyamide primer paint described in Formulation F was used to test the antisettling properties of the composition prepared in accordance with Example 3. The antisettling composition was added to the millbase of the epoxy part according to the procedures described in Formulation F, at a loading of 20 pounds per hundred gallons (includes solvent). The paint properties were evaluated and are set forth in Table 7.

COMPARATIVE EXAMPLE P

The epoxy part of an epoxy polyamide primer paint was prepared according to the procedures described in Formulation F and M-P-A 2000X was added to the millbase of the epoxy part. The antisettling composition loading was 20.0 pounds per hundred gallons (includes solvent). The paint properties were evaluated and are set forth in Table 7.

EXAMPLE 13

The epoxy part of an epoxy polyamide primer paint was prepared according to the procedures described in Formulation F and the antisettling composition prepared in accordance with Example 4 was added to the millbase of the epoxy part at a loading of 20 pounds per hundred gallons (includes solvent). The paint properties were evaluated and are set forth in Table 7.

COMPARATIVE EXAMPLE O

The epoxy part of an epoxy polyamide primer paint was prepared according to the procedures described in Formulation F, and M-P-A 2000T was added to the millbase. The antisettling composition loading was 20.0 pounds per hundred gallons (includes solvents). The paint properties were evaluated and are set forth in Table 7.

COMPARATIVE EXAMPLE R

The epoxy part of an epoxy polyamide primer paint was prepared according to the procedure described in Formulation F without the addition of an antisettling composition. The paint properties were evaluated and are set forth in Table 7.

| | Formulation F | | |
|---|---|---|---|
| Ingredient | Generic Name | Manufacturer | Pounds* |
| Epoxy/Polyamide Primer | | | |
| EPON 1001X75 | Epoxy Resin | Shell Chemical | 270.0 |
| Nuosperse 700 | Dispersant | Huls | 5.0 |
| Beetle 216-8 | Urea-formaldehyde resin | American Cyanamid | 5.5 |
| Xylene | Solvent | Ashland Chem. | 40.0 |
| Butanol | Solvent | Aldrich Chem. | 40.0 |
| Antisettling Composition | | | (see examples) |
| Disperse at 3,000 rpm for 5 minutes | | | |
| R-2899 | Red Iron Oxide | Pfizer | 36.5 |
| Celite 266 | Diatomaceous Earth | Johns-Manville | 29.0 |
| ONCOR M50 | Basic Lead Silico Chromate | NL Chemicals | 473.0 |
| Disperse at 5,500 rpm for 10 minutes at 130–135° F. | | | |
| Letdown at Low Speed | | | |
| Xylene | Solvent | Ashland Chem. | 76.0 |
| Butanol | Solvent | Aldrich Chem. | 76.0 |
| Curing Agent | | | |
| VERSAMID 125 | Polyamide Cure Agent | Henkel | 67.0 |
| Xylene | Solvent | Ashland Chem. | 40.2 |
| Butanol | Solvent | Aldrich Chem. | 40.2 |
| Total (without antisettling composition)) | | | 1198.4 |

*Basic Formulation; test composition may be prepared with different amounts, but proportional to those set forth.

TABLE 1

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| 5 | Ex. 1 | 1.8 | | | | | | | |
| | 2 wks, RT | | 6.5A | 2080/1068 | 1.95 | 86 | 83 | 5 | 9 |
| | 1 mon., RT | | 6.5A | 2100/1030 | 2.04 | 84 | 83 | 5 | 9 |
| | 3 mon., RT | | 6.5A | 1400/780 | 1.79 | 81 | 87 | 5 | 7 |
| | 1 yr., RT | | 6.5A | 1320/— | — | — | 87 | 4 | 7 |
| | 2 wks., 140° F. | | 6.5A | 960/704 | 1.36 | 80 | 90 | 3 | 7 |
| | 1 mon., 140° F. | | 6.5A | 700/650 | 1.08 | 78 | 90 | 3 | 6 |
| Comp Ex. A | No additive | — | | | | | | | |
| | 2 wks., RT | | 6.5A | 650/576 | 1.11 | 76 | 85 | 3 | 4 |
| | 1 mon., RT | | 6.5A | 500/490 | 1.02 | 74 | 84 | 3 | 4 |
| | 3 mon., RT | | 6.5A | 500/495 | 1.01 | 74 | 92 | 3.0 | 4 |
| | 1 yr., RT | | 6.5A | 608/— | — | — | 90 | 3.0 | 2 |
| | 2 wks., 140° F. | | 6.5A | 560/524 | 1.07 | 74 | 91 | 3 | 4 |
| | 1 mon., 140° F. | | 6.5A | 460/470 | 0.98 | 73 | 91 | 3 | 4 |
| Comp Ex. B | M-P-A 60MS | 3.6 | | | | | | | |
| | 2 wks., RT | | 6.5A | 2280/1044 | 2.18 | 85 | 83 | 6 | 9 |
| | 1 mon., RT | | 6.5A | 2000/1048 | 1.92 | 85 | 85 | 6 | 9 |
| | 3 mon., RT | | 6.5A | 1800/990 | 1.82 | 84 | 89 | 5 | 9 |
| | 1 yr., RT | | 6.5A | 1576/— | — | — | 87 | 5 | 8 |
| | 2 wks., 140° F. | | 6.5A | 840/696 | 1.21 | 80 | 90 | 3 | 7 |

TABLE 1-continued

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| | 1 mon., 140° F. | | 6.5A | 700/700 | 1.00 | 80 | 91 | 3 | 7 |
| Comp Ex. C | EGO 6 | 1.8 | | | | | | | |
| | 2 wks., RT | | 6.5A | 920/756 | 1.22 | 81 | 70 | 3 | 9 |
| | 1 mon., RT | | 6.5A | 600/580 | 1.03 | 76 | 87 | 3 | 4 |
| | 3 mon., RT | | 6.5A | 600/600 | 1.00 | 77 | 92 | 3 | 4 |
| | 1 yr., RT | | 6.5A | 608/— | 0.82 | — | 90 | 3 | 2 |
| | 2 wks., 140° F. | | 6.5A | 640/600 | 1.07 | 77 | 91 | 3 | 4 |
| | 1 mon., 140° F. | | 6.4A | 500/550 | 0.91 | 75 | 90 | 3 | 4 |

*pounds per hundred gallons

TABLE 2

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| 6 | Ex. 1 | 3.6 | | | | | | | |
| | 2 wks., RT | | 4.5A | 1250/865 | 1.44 | 84 | — | 7 | 9 |
| | 1 mon., RT | | 4.5A | 1300/790 | 1.65 | 82 | — | 6 | 8 |
| | 3 mon., RT | | 4.5A | 1500/910 | 1.65 | 84 | — | 6 | 7 |
| | 1 yr., RT | | 4.5A | 1320/— | — | — | — | 5.8 | 6 |
| | 2 wks., 140° F. | | 4.5A | 800/500 | 1.60 | 73 | — | 4 | 5 |
| | 1 mon., 140° F. | | 4.5B | 900/500 | 1.80 | 71 | — | 4 | 2 |
| Comp Ex. D | M-P-A 60MS | 3.6 | | | | | | | |
| | 2 wks., RT | | 4.5A | 1100/870 | 1.26 | 84 | — | 7 | 9 |
| | 1 mon., RT | | 4.5A | 1150/795 | 1.45 | 82 | — | 6 | 8 |
| | 3 mon., RT | | 4.5A | 1300/900 | 1.44 | 84 | — | 6 | 7 |
| | 1 yr., RT | | 4.5A | 1200/— | — | — | — | 6 | 7 |
| | 2 wks., 140° F. | | 4.5A | 600/480 | 1.25 | 73 | — | 4 | 5 |
| | 1 mon., 140° F. | | 4.5B | 550/445 | 1.24 | 72 | — | 4 | 2 |

*pounds per hundred gallons

TABLE 3

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| 7 | Ex. 1 | 1.44 | | | | | | | |
| | 2 wks., RT | | 6A | 760/712 | 1.08 | 79 | 84 | 3 | 8 |
| | 1 mon., RT | | 6A | 800/740 | 1.10 | 79 | 88 | 3 | 8 |
| | 3 mon., RT | | 6B | 750/695 | 1.08 | 79 | 91 | 3 | 8 |
| | 1 yr., RT | | 6.5B | 752/— | — | — | 90 | 3 | 8 |
| | 2 wks., 140° F. | | 6A | 840/744 | 1.13 | 80 | 83 | 3 | 8 |
| | 1 mon., 140° F. | | 6A | 1900/1200 | 1.58 | 88 | 88 | 4.5 | 7 |
| Comp Ex. E | No additive | — | — | | | | | | |
| | 2 wks., RT | | 6A | 680/620 | 1.01 | 76 | 85 | 3 | 8 |
| | 1 mon., RT | | 6A | 700/650 | 1.08 | 77 | 88 | 3 | 7 |
| | 3 mon., RT | | 6A | 650/615 | 1.06 | 76 | 90 | 3 | 5 |
| | 1 yr., RT | | 6.5B | 648/— | — | — | 91 | 3 | 5 |
| | 2 wks., 140° F. | | 6A | 760/676 | 1.12 | 78 | 89 | 3 | 7 |
| | 1 mon., 140° F. | | 6A | 1600/1070 | 1.50 | 86 | 89 | 4 | 5 |
| Comp Ex. F | M-P-A 60MS | 1.92 | | | | | | | |
| | 2 wks., RT | | 6.0A | 840/784 | 1.07 | 81 | 81 | 4 | 8 |
| | 1 mon., RT | | 6.0A | 800/800 | 1.00 | 82 | 82 | 3.5 | 8 |
| | 3 mon., RT | | 6.0A | 800/700 | 1.14 | 81 | 89 | 3.5 | 8 |
| | 1 yr., RT | | 6.0A | 872/— | — | — | 89 | 3 | 8 |
| | 2 wks., 140° F. | | 6.0A | 880/775 | 1.13 | 80 | 68 | 4 | 8 |
| | 1 mon., 140° F. | | 6.0A | 900/830 | 1.08 | 82 | 78 | 3.5 | 8 |
| Comp. Ex. G | EGO 6 | 1.44 | | | | | | | |
| | 2 wks., RT | | 6A | 760/700 | 1.09 | 79 | 84 | 3 | 8 |
| | 1 mon., RT | | 6A | 800/720 | 1.11 | 89 | 88 | 3 | 8 |
| | 3 mon., RT | | 6A | 650/610 | 1.07 | 77 | 91 | 3 | 8 |
| | 1 yr., RT | | 6.5B | 728/— | — | — | 89 | 3 | 8 |
| | 2 wks., 140° F. | | 6A | 1920/1216 | 1.58 | 89 | 83 | 4 | 8 |
| | 1 mon., 140° F. | | 6A | 2700/1420 | 1.90 | 90 | 88 | 5.5 | 7 |

*pounds per hundred gallons

TABLE 4

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| 8 | Ex. 1 | 1.92 | | | | | | | |
| | 2 wks., RT | | 3.0A | 1500/465 | 3.23 | 70 | — | 18 | 8 |
| | 1 mon., RT | | 3.0A | 1300/415 | 3.13 | 68 | — | 18 | 8 |
| | 3 mon., RT | | 3.0A | 1500/560 | 2.68 | 69 | — | 20 | 8 |

TABLE 4-continued

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| | 1 yr., RT | | 3.0A | 1488/— | — | — | — | 20 | 7 |
| | 2 wks., 140° F. | | 3.0A | 1440/420 | 3.33 | 68 | — | 20 | 7 |
| | 1 mon., 140° F. | | 3.0A | 1450/445 | 3.26 | 59 | — | 16 | 7 |
| Comp. Ex. H | No additive | — | | | | | | | |
| | 2 wks., RT | | 3.0A | 750/330 | 2.27 | 67 | — | 14 | 7 |
| | 1 mon., RT | | 3.0A | 650/295 | 2.20 | 66 | — | 12 | 7 |
| | 3 mon., RT | | 3.0A | 700/300 | 2.33 | 68 | — | 16 | 7 |
| | 1 yr., RT | | 3.0A | 680/— | — | — | — | 14 | 2 |
| | 2 wks., 140° F. | | 3.0A | 250/205 | 1.22 | 66 | — | 12 | 5 |
| | 1 mon., 140° F. | | 3.0A | 450/270 | 1.67 | 66 | — | 10 | 2 |
| Comp Ex. I | M-P-A 60MS | 1.92 | | | | | | | |
| | 2 wks., RT | | 3.0A | 1400/470 | 298 | 70 | — | 18 | 8 |
| | 1 mon., RT | | 3.0A | 1250/415 | 3.07 | 68 | — | 18 | 8 |
| | 3 mon., RT | | 3.0A | 1400/450 | 3.11 | 69 | — | 20 | 8 |
| | 1 yr., RT | | 3.0B | 1340/— | — | — | — | 18 | 7 |
| | 2 wks., 140° F. | | 3.0A | 1250/390 | 3.21 | 68 | — | 18 | 6 |
| | 1 mon., 149° F. | | 3.0A | 1350/430 | 3.14 | 68 | — | 16 | 6 |
| Comp Ex. J | EGO 6 | 1.92 | | | | | | | |
| | 2 wks., RT | | 3.0A | 1450/485 | 2.99 | 70 | — | 18 | 8 |
| | 1 mon., RT | | 3.0A | 1400/440 | 3.18 | 69 | — | 18 | 8 |
| | 3 mon., RT | | 3.0A | 1500/460 | 3.26 | 69 | — | 20 | 8 |
| | 1 yr., RT | | 3.0A | 1550/— | — | — | — | 20 | 7 |
| | 2 wks., 140° F. | | 3.0A | 1350/430 | 3.14 | 68 | — | 18 | 6 |
| | 1 mon., 140° F. | | 3.0A | 1300/455 | 2.86 | 69 | — | 16 | 6 |

*pounds per hundred gallons

TABLE 5

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| 9 | Ex. 3 | 5.0 | | | | | | | |
| | 1 mon., RT | | 5.0A | 240/230 | 1.04 | 61 | — | 5 | 7 |
| | 3 mon., RT | | 5.0A | 440/348 | 1.26 | 66 | — | 5 | 6 |
| | 1 mon., 140° F. | | 5.0A | 472/344 | 1.37 | 66 | — | 6 | 4 |
| 10 | Ex. 3 | 3.6 | | | | | | | |
| | 1 mon., RT | | 5.0A | 256/248 | 1.03 | 64 | — | 4 | 6 |
| | 3 mon., RT | | 5.0A | 480/326 | 1.07 | 66 | — | 6 | 5 |
| | 1 mon., 140° F. | | 5.0A | 300/280 | 1.33 | 67 | — | 6 | 5 |
| Comp Ex. K | No additive | — | | | | | | | |
| | 1 mon., RT | | 4.0A | 264/288 | 0.92 | 65 | — | 4 | 0 |
| | 3 mon., RT | | Not tested | | | | | | |
| | 1 mon., 140° F. | | 4.5A | 272/285 | 0.95 | 64 | — | 4 | 0 |
| Comp Ex. L | M-P-A 2000X | 5.0 | | | | | | | |
| | 1 mon., RT | | 5.0A | 260/255 | 1.02 | 64 | — | 4 | 7 |
| | 3 mon., RT | | 5.0A | 350/314 | 1.11 | 67 | — | 6 | 6 |
| | 1 mon., 140° F. | | 5.0A | 480/358 | 1.34 | 67 | — | 6 | 5 |
| Comp Ex. M | M-P-A 2000X | 3.6 | | | | | | | |
| | 1 mon., RT | | 4.5A | 420/358 | 1.17 | 67 | — | 5 | 3 |
| | 3 mon., RT | | 4.5A | 420/365 | 1.15 | 67 | — | 6 | 2 |
| | 1 mon., 140° F. | | 4.5A | 488/356 | 1.37 | 66 | — | 6 | 5 |

*pounds per hundred gallon

TABLE 6

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| 11 | Ex. 4 | 3.8 | | | | | | | |
| | 1 mon., RT | | 4.0B | 320/248 | 1.29 | 62 | — | 4 | 7 |
| | 3 mon., RT | | 4.0B | 320/262 | 1.22 | 64 | — | 6 | 7 |
| | 1 mon., 140° F. | | 4.0B | 350/248 | 1.41 | 64 | — | 5 | 6 |
| Comp Ex. N | No additive | — | | | | | | | |
| | 1 mon., RT | | 4.0B | 106/114 | 0.93 | 62 | — | 4 | 0 |
| | 3 mon., RT | | 4.0B | 200/228 | 0.86 | 62 | — | 4 | 0 |
| | 1 mon., 140° F. | | 4.0B | 220/226 | 0.97 | 64 | — | 4 | 0 |
| Comp Ex. O | M-P-A 2000T | 3.8 | | | | | | | |
| | 1 mon., RT | | 4.5B | 340/264 | 1.29 | 64 | — | 4 | 7 |
| | 3 mon., RT | | 4.5B | 320/256 | 1.25 | 64 | — | 5 | 7 |
| | 1 mon., 140° F. | | 4.5B | 350/248 | 1.41 | 65 | — | 5 | 5 |

*pounds per hundred gallon

TABLE 7

| Example Number | Antisettling Composition | Loading (phg)* | FOG | Brookfield Visc., cP 10 rpm/100 rpm | T.I. | Stormer Visc. (KU) | Gloss (60°) | Sag (mils) | Pigment Settling |
|---|---|---|---|---|---|---|---|---|---|
| 12 | Ex. 3 | 20 | | | | | | | |
| | 1 mon., RT | | 4.0B | 1154/364 | 3.17 | 67 | — | 8.2 | 9 |
| | 1 mon., 140° F. | | 4.0B | 520/240 | 2.17 | 67 | — | 4.8 | 5 |
| Comp Ex. P | M-P-A 2000X | 20 | | | | | | | |
| | 1 mon., RT | | 4.0B | 1160/364 | 3.19 | 67 | — | 8.6 | 9 |
| | 1 mon., 140° F. | | 4.0B | 592/264 | 2.24 | 67 | — | 4.2 | 5 |
| 13 | Ex. 4 | 20 | | | | | | | |
| | 1 mon., RT | | 3.5B | 1096/360 | 3.04 | 67 | — | 8.9 | 9 |
| | 1 mon., 140° F. | | 3.5B | 536/260 | 2.06 | 67 | — | 4.2 | 5 |
| Comp Ex. Q | M-P-A 2000T | 20 | | | | | | | |
| | 1 mon., RT | | 3.5B | 1248/390 | 3.20 | 68 | — | 9.0 | 9 |
| | 1 mon., 140° F. | | 4.0B | 608/272 | 2.24 | 67 | — | 3.6 | 5 |
| Comp Ex. R | No additive | — | | | | | | | |
| | 1 mon., RT | | 4.5B | 792/292 | 2.71 | 67 | — | 5.8 | 9 |
| | 1 mon., 140° F. | | 4.0B | 152/144 | 0.81 | 66 | — | 3.0 | 5 |

*(total antisettling composition amount including solvent)

Other embodiments of the invention will be apparent to those skilled in the art from consideration of the specification and practice of the invention disclosed herein. It is intended that the specification and examples be considered as exemplary only, with a true scope and spirit of the invention being indicated b the following claims.

What is claimed is:

1. A liquid antisettling composition consisting essentially of:
   (a) at least one emulsifiable polyethylene was in an amount of from about 3 wt.% to about 28 wt. %;
   (b) at least one salt o an alkyl hydrogen sulfate in an amount of from about 0.3 wt.% to about 10 wt.%;
   (c) at least one salt of a reaction product of a polyvalent inorganic acid and a compound selected from the group consisting of fatty ester compounds and fatty acid derivative compounds in an amount of from about 0.3 wt.% to about 10 wt.%; and
   (d) an organic solvent in an amount of from about 70 wt.% to about 95 wt.%.

2. The liquid antisettling composition of claim 1 further comprising water.

3. The liquid antisettling composition of claim 1 wherein said at least one emulsifiable polyethylene was has an acid number of from about 0 to about 50, a softening point of from about 90° C. to about 120° C., and a density of from about 0.92 g/cc to about 0.98 g/cc.

4. The liquid antisettling composition of claim 1 wherein at least one emulsifiable polyethylene wax is an oxidized polyethylene homopolymer having a density of from about 0.92 g/cc to about 0.94 g/cc and an acid number of from about 10 to about 20.

5. The liquid antisettling composition of claim 1 wherein at least one salt of an alkyl hydrogen sulfate is selected from the group consisting of sodium decyl sulfate, sodium lauryl sulfate, a sodium salt of 1-hexadecylsulfonic acid and triethanolamine lauryl sulfate.

6. The liquid antisettling composition of claim 1 wherein at least one salt of an alkyl hydrogen sulfate is sodium lauryl sulfate.

7. The liquid antisettling composition of claim 1 wherein at least one salt is sulfated/sulfonated castor oil.

8. The liquid antisettling composition of claim 1 wherein at least one salt is sulfated castor oil.

9. The liquid antisettling composition of claim 1 wherein at least one emulsifiable polyethylene wax is an oxidized polyethylene homopolymer having a density of from about 0.92 g/cc to about 0.94 g/cc and an acid number of from about 10 to about 20, at least one salt of an alkyl hydrogen sulfate is sodium lauryl sulfate, and at least one salt of a reaction product of a polyvalent inorganic acid and a compound selected from the group consisting of fatty ester compounds and fatty acid derivative compounds is sulfated/sulfonated castor oil.

10. The liquid antisettling composition of claim 1 wherein at least one emulsifiable polyethylene wax is an oxidized polyethylene homopolymer having a density of from about 0.92 g/cc to about 0.94 g/cc and an acid number of from about 10 to about 20, at least one salt of an alkyl hydrogen sulfate is sodium lauryl sulfate, and at least one salt of a reaction product of a polyvalent inorganic acid and a compound selected from the group consisting of fatty ester compounds and fatty acid derivative compounds is sulfated castor oil.

* * * * *

UNITED STATES PATENT AND TRADEMARK OFFICE
CERTIFICATE OF CORRECTION

PATENT NO. : 4,975,119

DATED : December 4, 1990

INVENTOR(S) : Murray C. Cooperman

It is certified that error appears in the above-identified patent and that said Letters Patent is hereby corrected as shown below:

Column 23;

Claim 1, line 31: Change "was" to --wax--.

line 33: Change "o" to --of--.

Claim 3, line 45: Change "was" to --wax--.

Signed and Sealed this

Seventh Day of July, 1992

Attest:

DOUGLAS B. COMER

Attesting Officer

Acting Commissioner of Patents and Trademarks